(12) United States Patent
Fortin

(10) Patent No.: US 11,446,988 B2
(45) Date of Patent: Sep. 20, 2022

(54) HYBRID DOOR MODULE

(71) Applicant: MAGNA CLOSURES INC., Newmarket (CA)

(72) Inventor: Raymond Edward Fortin, Newmarket (CA)

(73) Assignee: MAGNA CLOSURES INC., Newmarket (CA)

( * ) Notice: Subject to any disclaimer, the term of this patent is extended or adjusted under 35 U.S.C. 154(b) by 302 days.

(21) Appl. No.: 16/700,849

(22) Filed: Dec. 2, 2019

(65) Prior Publication Data

US 2020/0171926 A1 Jun. 4, 2020

Related U.S. Application Data

(60) Provisional application No. 62/774,909, filed on Dec. 4, 2018.

(51) Int. Cl.
*B60J 5/04* (2006.01)

(52) U.S. Cl.
CPC ........... *B60J 5/0416* (2013.01); *B60J 5/0413* (2013.01); *B60J 5/0418* (2013.01); *B60J 5/0468* (2013.01)

(58) Field of Classification Search
None
See application file for complete search history.

(56) References Cited

U.S. PATENT DOCUMENTS

| | | | |
|---|---|---|---|
| 6,571,515 B1* | 6/2003 | Samways | B60J 5/0416 49/502 |
| 7,045,202 B2 | 5/2006 | Tanaka et al. | |
| 7,442,435 B2 | 10/2008 | Lee et al. | |
| 7,610,720 B2 | 11/2009 | Kirejczyk et al. | |
| 8,651,557 B2* | 2/2014 | Suzuki | B60J 5/0402 296/146.2 |
| 8,764,099 B2* | 7/2014 | Suzuki | B60J 10/76 296/146.2 |
| 9,126,470 B2 | 9/2015 | Kaliomaki et al. | |
| 9,333,837 B2* | 5/2016 | Broadhead | B60J 5/06 |
| 9,610,978 B2* | 4/2017 | Kim | B62D 25/082 |
| 10,946,730 B2* | 3/2021 | Jeon | B60J 5/0455 |
| 2005/0052050 A1* | 3/2005 | Kora | B60J 5/0425 296/146.1 |
| 2005/0102953 A1* | 5/2005 | Masunaga | B60J 1/17 52/633 |
| 2005/0140180 A1* | 6/2005 | Hesch | B60R 21/0428 296/208 |
| 2006/0066446 A1* | 3/2006 | Uesugi | B60J 5/0455 340/438 |
| 2006/0261635 A1* | 11/2006 | Winborn | B60J 5/0452 296/154 |

(Continued)

FOREIGN PATENT DOCUMENTS

| | | | | |
|---|---|---|---|---|
| EP | 0015201 A1 * | 9/1980 | ........... | B62D 29/001 |
| WO | 2019118816 A1 | 6/2019 | | |

*Primary Examiner* — Marcus Menezes
(74) *Attorney, Agent, or Firm* — Dickinson Wright PLLC

(57) ABSTRACT

A carrier module for a motor vehicle door assembly having inner and outer panels defining a door panel structure with the inner panel having an opening for selective access to an internal door cavity between the inner and outer panels are provided. The carrier module includes a carrier having an outer periphery configured for attachment to the inner panel to substantially close off the opening with the outer periphery bounding a wall having a variable wall thickness with support regions of the wall having an increased thickness relative to adjacent non-support regions.

11 Claims, 9 Drawing Sheets

(56) References Cited

U.S. PATENT DOCUMENTS

| | | | |
|---|---|---|---|
| 2006/0264554 A1 | 11/2006 | Lustiger et al. | |
| 2006/0265963 A1* | 11/2006 | Winborn | B60J 5/0418 49/502 |
| 2007/0039245 A1* | 2/2007 | Buchta | E05F 11/382 49/502 |
| 2008/0276541 A1* | 11/2008 | Roy | B60J 5/0413 49/502 |
| 2009/0134658 A1* | 5/2009 | Hanna | B60J 5/0418 296/146.5 |
| 2011/0010999 A1* | 1/2011 | Broadhead | E05F 11/385 49/352 |
| 2014/0117706 A1* | 5/2014 | Fortin | B60J 5/0418 296/146.6 |
| 2015/0246596 A1* | 9/2015 | Kajigai | B60J 5/0481 296/146.6 |
| 2016/0001642 A1* | 1/2016 | Fortin | B60J 5/0401 49/503 |
| 2016/0251039 A1* | 9/2016 | Iwano | B29C 45/16 296/181.2 |
| 2017/0313165 A1 | 11/2017 | Fortin et al. | |
| 2017/0314306 A1 | 11/2017 | Fortin et al. | |
| 2018/0345765 A1 | 12/2018 | Magazzini et al. | |
| 2018/0354349 A1* | 12/2018 | Fortin | B60J 5/0418 |
| 2019/0077232 A1* | 3/2019 | Miller | B60R 22/24 |
| 2019/0078366 A1 | 3/2019 | Lu et al. | |
| 2020/0001691 A1* | 1/2020 | Grella | B60J 5/0455 |
| 2020/0148048 A1* | 5/2020 | Dunn | B60J 10/16 |
| 2021/0008965 A1* | 1/2021 | Hwang | B60R 21/00 |
| 2021/0300161 A1* | 9/2021 | Fortin | B32B 27/12 |

\* cited by examiner

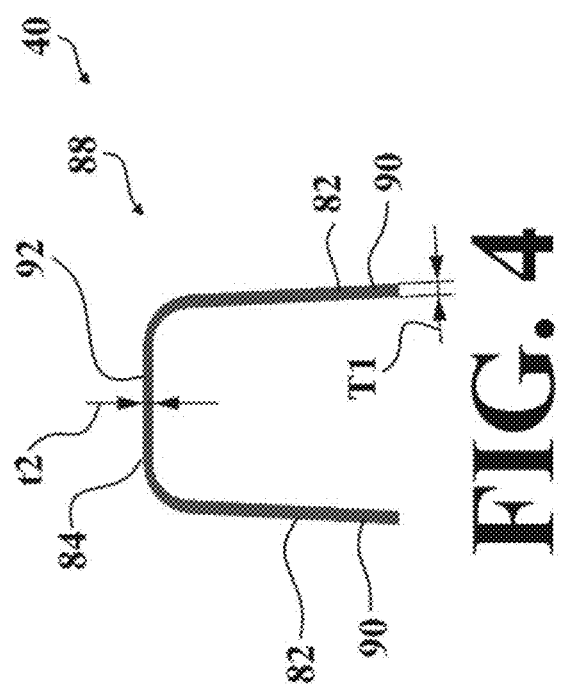

HYBRID DOOR MODULE

CROSS-REFERENCE TO RELATED APPLICATION

This application claims the benefit of U.S. Provisional Application Ser. No. 62/774,909, filed Dec. 4, 2018, which is incorporated herein by way of reference in its entirety.

FIELD

The present disclosure relates generally to vehicle door assemblies, and more particularly to carrier modules therefor.

BACKGROUND

This section provides background information related to the present disclosure which is not necessarily prior art.

The automotive industry continuously seeks to better protect occupants of vehicles during crash conditions. In particular, attention is continually being dedicated to preventing occupant injury during side impacts, since there is relatively little structure in vehicle panels and doors that is available to protect vehicle occupants, as compared to the safety structure present during front-end or rear-end collisions. In recent years, the use of side impact beams, also known as intrusion beams, has become more common. However, these beams, in at least some instances, have made more complicated and costly the process of manufacturing vehicle door assemblies. In such cases, the intrusion beam extends across the opening of an inner door panel that is used to mount components within a cavity between the inner door panel and an outer door panel and to mount the carrier to the inner door panel, and thus can interfere with the mounting of the components and carrier. In addition to complicating assembly, known intrusion beams are typically provided as stampings of solid steel beams configured as separate components for fixation to the door panel, and thus, they tend to be bulky, heavy, and costly from a material content standpoint. As such, aside from complicating assembly, known intrusion beams negatively affect fuel efficiency via added weight, which is also receiving ever-increasing attention, such as through fuel economy regulation laws.

Further yet, the automotive industry continuously seeks to better protect components within the cavity between the inner and outer door panels against environmental effects as well as against side impact forces, while at the same time reducing the weight of vehicles. Typically, the carrier is provided having a uniform thickness of material suitable for closing off the opening, while also providing the protection against environmental effects and side impact forces desired. However, known carriers tend to be relatively bulky, and thus, add weight to the vehicle.

In view of the above, there is a need to provide an intrusion member and carrier that can be readily attached to an inner door panel of a door assembly without difficulty and without compromising the ability of the door assembly to provide enhanced side impact resistance, provide protection against environmental effects, and to enhance economies of manufacture and assembly, while also reducing weight to enhance fuel economy of the vehicle.

SUMMARY

This section provides a general summary of the disclosure and is not intended to be considered a complete and comprehensive listing of the disclosure's full scope or all of its aspects, advantages, objectives and/or features.

In accordance with one aspect, the present disclosure is directed to an intrusion member for a door assembly of a motor vehicle that provides enhanced side impact resistance and enhances economies of manufacture and assembly, while also reducing weight, thereby enhancing fuel economy of the vehicle.

In accordance with another aspect of the disclosure, the present disclosure is directed to a carrier module for a door assembly of a motor vehicle, with the carrier module having an integral intrusion member that provides enhanced side impact resistance and enhances economies of manufacture and assembly, while also reducing weight, thereby enhancing fuel economy of the vehicle.

In accordance with another aspect of the disclosure, the present disclosure is directed to a door assembly for a motor vehicle having an outer panel, an inner panel, and a carrier module fixed to the inner panel and including an intrusion member integral to the carrier module that provides enhanced side impact resistance to the door assembly and enhances economies of manufacture and assembly, while also reducing weight of the door assembly, thereby enhancing fuel economy of the vehicle.

In accordance with another aspect of the disclosure, the present disclosure is directed to a carrier module for a door assembly of a motor vehicle, with the carrier module having a wall bounded by an outer periphery sized to close off an opening in an inner door panel, wherein the wall is provided having a variable wall thickness, with relatively thickened regions having a first thickness providing enhanced support and mount surfaces and side impact resistance as an intrusion member and relatively thinned regions having a second thickness, that is less than the first thickness, enhancing economies of manufacture and assembly, while also reducing weight, thereby enhancing fuel economy of the vehicle.

In accordance with another aspect of the disclosure, the wall of the carrier module has generally planar regions configured to extend in generally parallel relation with the inner door panel and a plurality of intrusion members formed as raised support channels having sidewalls extending outwardly from the generally planar regions, wherein the generally planar regions are generally provided as the relatively thinned regions and the sidewalls of the raised support channels are generally provided as the relatively thickened regions of the intrusion member.

In accordance with another aspect of the disclosure, the raised support channels can be provided having plateau regions extending between and joining pairs of the sidewalls to one another, wherein the plateau regions can be provided as the relatively thinned regions to facilitate the reduction of material content and weight.

In accordance with another aspect of the disclosure, the sidewalls and the plateau regions can be formed having fibers bonded therein.

In accordance with another aspect of the disclosure, the planar regions can be formed having fibers bonded therein.

In accordance with another aspect of the disclosure, the fibers can be randomly oriented relative to one another within the sidewalls, the plateau regions and the generally planar regions, thereby providing the wall having an isotropic fiber orientation, which ultimately increases the strength of the wall and reduced internal stresses therein.

In accordance with another aspect of the disclosure, at least some of the fibers in the plateaus regions and in the sidewalls can be provided having a length between about 8-14 mm.

In accordance with another aspect of the disclosure, at least some of the fibers randomly oriented throughout the entirety of the wall can be provided having a length between about 8-14 mm.

In accordance with another aspect of the disclosure, the relatively thinned regions can be provided having a thickness between about ¼-¾ the thickness of the relatively thickened regions.

In accordance with another aspect of the disclosure, the present disclosure is directed to a door assembly for a motor vehicle having an outer panel, an inner panel, and a carrier module fixed to the inner panel, with the carrier module having a wall bounded by an outer periphery sized to close off an opening in the inner panel, wherein the wall is provided having a variable wall thickness, with relatively thickened regions having a first thickness providing enhanced support and mount surfaces and side impact resistance as an intrusion member and relatively thinned regions having a second thickness, that is less than the first thickness to enhance economies of manufacture and assembly, while also reducing weight of the door assembly, thereby enhancing fuel economy of the vehicle.

In accordance with another aspect of the disclosure, the relatively thinned regions can include reinforcing glass fibers having a first length and the relatively thickened regions can have elongated fibers having a second length, wherein the second length is greater than the first length, with the relatively thinned regions being void of the elongated fibers.

In accordance with another aspect of the disclosure, the elongated fibers can have a length that is 5 times greater or more than the length of the reinforcing glass fibers, thereby providing enhanced strength to the relatively thickened regions.

In accordance with another aspect of the disclosure, the present disclosure is directed to a method of constructing a carrier module for a door assembly of a motor vehicle, including: molding a wall bounded by an outer periphery sized to close off an opening in an inner door panel and molding the wall having a variable wall thickness, with relatively thickened regions having a first thickness providing an intrusion member with enhanced support and mount surfaces and side impact resistance, and relatively thinned regions having a second thickness, that is less than the first thickness, enhancing economies of manufacture and assembly, while also reducing weight, thereby enhancing fuel economy of the vehicle.

In accordance with another aspect of the disclosure, the method of constructing the carrier module can further include molding the wall having generally planar regions configured to extend in generally parallel relation with the inner door panel and molding a plurality of raised support channels having sidewalls extending outwardly from the generally planar regions, and further including molding the generally planar regions as the relatively thinned regions and molding the sidewalls of the raised support channels as the relatively thickened regions.

In accordance with another aspect of the disclosure, the method of constructing the carrier module can further include molding the raised support channels having plateau regions extending between and joining pairs of the sidewalls to one another, and further including molding the plateau regions as the relatively thinned regions.

In accordance with another aspect of the disclosure, the method of constructing the carrier module can further include molding the relatively thinned regions having a thickness between about ¼-¾ the thickness of the relatively thickened regions.

In accordance with another aspect of the disclosure, the method of constructing the carrier module can further include molding the carrier module in a compression molding process, thereby allowing the relative thicknesses of the relatively thinned regions and the relatively thickened regions to be precisely controlled.

In accordance with another aspect of the disclosure, the method of constructing the carrier module can further include controlling the relative thicknesses of the relatively thinned regions and the relatively thickened regions by regulating the distance between compression clamps defining a mold cavity.

In accordance with another aspect of the disclosure, the method of constructing the carrier module can further include controlling the thickness of the relatively thinned regions by regulating the distance between compression clamps defining a mold cavity.

In accordance with another aspect of the disclosure, the method of constructing the carrier module can further include controlling the thickness of the relatively thinned regions by regulating the distance between compression clamps defining a mold cavity while providing the relatively thickened regions with the same, or generally the same (intended to mean a slight, but negligible difference may result), first thickness regardless of the distance between the compression clamps.

In accordance with another aspect of the disclosure, the method of constructing the carrier module can further include molding the relatively thinned regions including reinforcing glass fibers having a first length and the relatively thickened regions including elongated fibers having a second length, wherein the second length is greater than the first length, with the relatively thinned regions being void of the elongated fibers.

In accordance with another aspect of the disclosure, the method of constructing the carrier module can further include providing the elongated fibers having a length that is 5 times greater or more than the length of the reinforcing glass fibers, thereby providing enhanced strength to the relatively thickened regions.

Further areas of applicability will become apparent from the description provided herein. The description and specific examples in this summary are only intended to illustrate certain non-limiting embodiments which are not intended to limit the scope of the present disclosure.

BRIEF DESCRIPTION OF THE DRAWINGS

The drawings described herein are for illustrative purposes only of selected non-limiting embodiments and are not intended to limit the scope of the present disclosure. In this regard the drawings include:

FIG. 4 is a cross-sectional view taken generally along 4-4 of FIG. 3;

DETAILED DESCRIPTION OF EXAMPLE EMBODIMENTS

Figure 1:
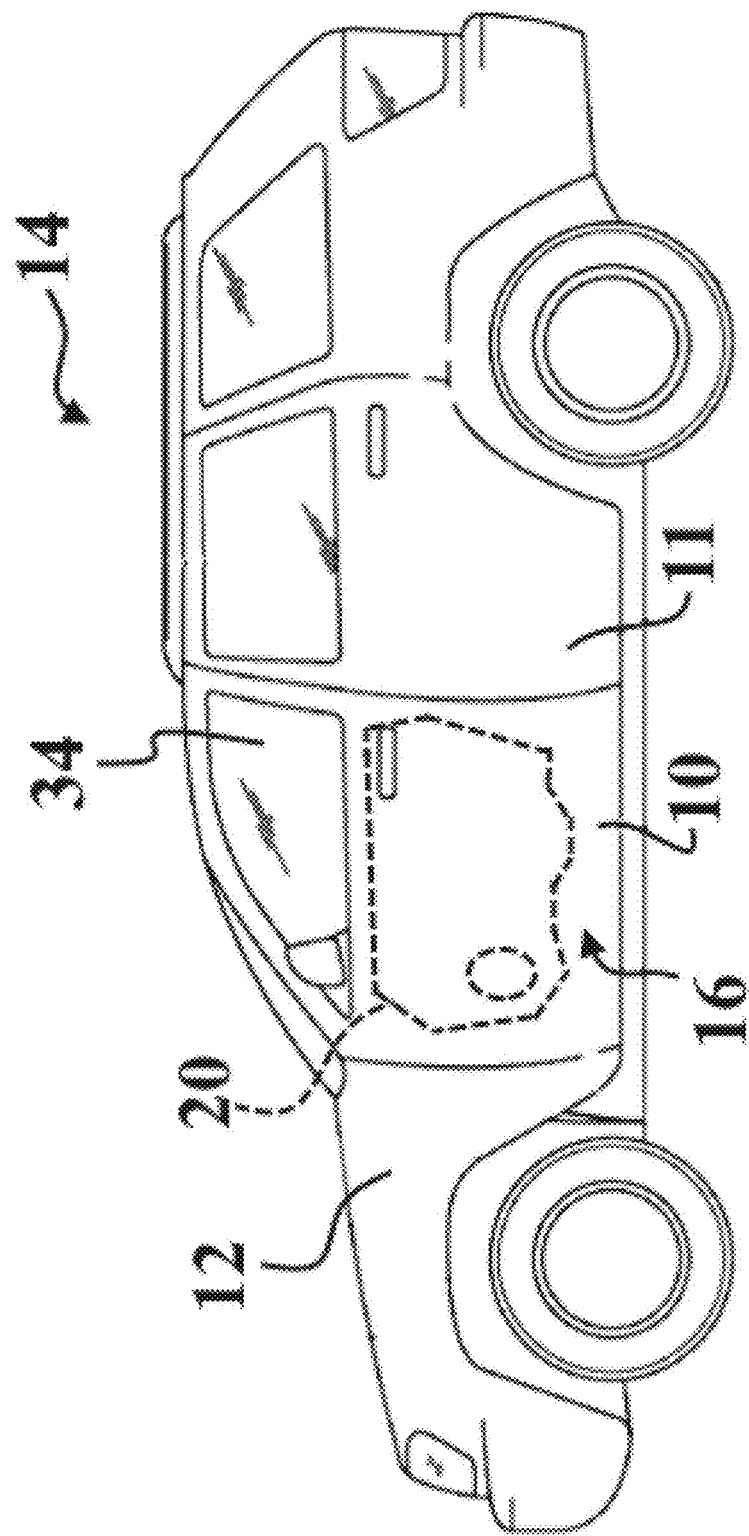
FIG. 1 illustrates a motor vehicle with a door assembly constructed in accordance with one aspect of the disclosure.

In general, example embodiments of a door assembly with carrier module and carrier module therefor, of the type configured including window regulators to be installed within an internal door cavity of a motor vehicle door assembly and having a barrier member configured to separate a wet side from a dry side of the door assembly, constructed in accordance with the teachings of the present disclosure will now be disclosed. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail, as they will be readily understood by the skilled artisan in view of the disclosure herein.

An example one-piece carrier module embodiment disclosed in accordance with one aspect of the disclosure includes a barrier member and a carrier member configured to provide an integral, pre-integrated intrusion member arrangement, with a pair of window regulators integrally attached to the carrier member, wherein the carrier member allows the associated window regulators and components to be supported while providing improved instruction protection.

Another example one-piece carrier module embodiment disclosed in accordance with an aspect of the disclosure includes a wall bounded by an outer periphery sized to close off an opening in an inner door panel, wherein the wall is provided having a varying wall thickness to provide relatively thickened regions having a first thickness providing enhanced support and mount surfaces and an integral intrusion member for side impact resistance and relatively thinned regions having a second thickness, that is less than the first thickness, enhancing economies of manufacture and assembly, while also reducing weight, thereby enhancing fuel economy of the vehicle.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

Reference is made to FIG. 1, which shows a door assembly 10 mounted to a body 12 of a motor vehicle 14. The door assembly 10 includes an outer panel 16, an inner panel 18 and a carrier assembly, referred to hereafter as carrier module 20, constructed in accordance with one presently preferred aspect of the disclosure. The construction, assembly, performance and structural impact resistance of the door assembly 10 is facilitated and enhanced directly as a result of the configuration of the carrier module 20, as discussed further hereafter, as will be readily appreciated by one skilled in the art upon viewing the disclosure herein. It will also be appreciated by the skilled artisan that the carrier module 20 can be incorporated into a rear passenger door assembly 11 or any other closure panel desired.

Figure 2:
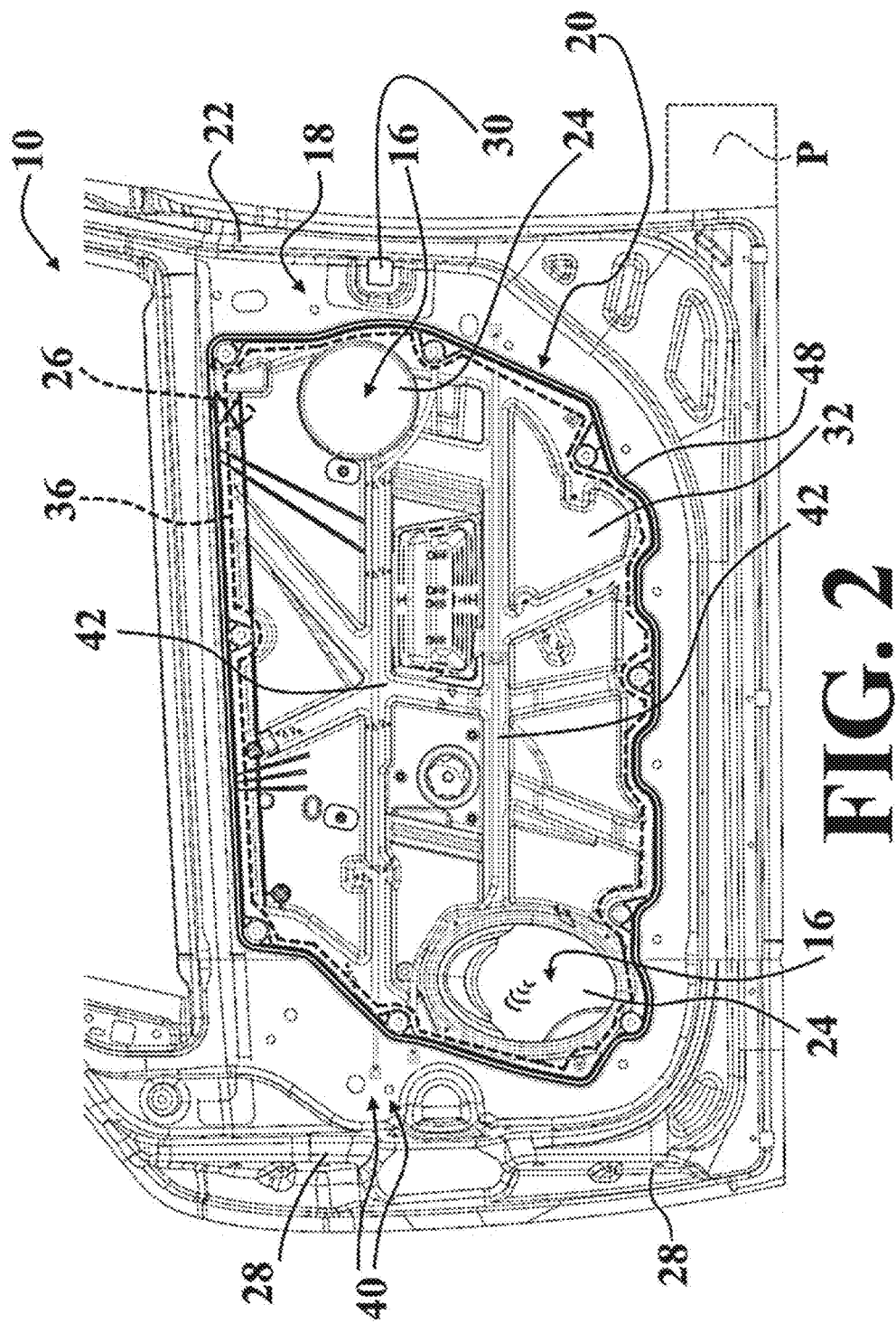
FIG. 2 illustrates a plan view of a door assembly of the vehicle of FIG. 1 having a carrier module in accordance with an aspect of the disclosure.

The outer panel 16 forms at least part of the exterior surface of the door assembly 10. The inner panel 18 provides a structural member for the mounting of one or more trim pieces that form an inner surface of the door assembly 10. Some of the inner panel 18 may itself also form part of the inner surface of the door assembly 10, if desired. The outer and inner panels 16, 18 are connected together to provide a door panel structure 22 that forms an internal door cavity, referred to hereafter as cavity 24, that contains various components of the door assembly 10, including components of the carrier module 20. To facilitate assembly of the components into the cavity 24, the inner panel 18 has at least one opening 26 (FIG. 2A). The opening 26 is sized to allow access to the cavity 24 as necessary for assembly and service of components therein, as is known.

The outer and inner panels 16, 18 may be made from any suitable material or combination of materials. For example, the outer and inner panels 16, 18 may both be made from a suitable metal (e.g. a suitable steel). In another example, the outer panel 16 may be made from a suitable polymeric or composite material (e.g. fiberglass) and the inner panel may be made from a suitable metal, by way of example and without limitation.

A pair of hinges 28 are connected to door panel structure 22 and pivotally mount a front end of door panel structure 22 (and door assembly 10) to the vehicle body 12. A door latch 30 is mounted to the rear end of door panel structure 22 to permit the releasable closure of door assembly 10 against vehicle body 12, as is known. Hinges 28 and door latch 30 act as force transfer members through which forces in door assembly 10 are transmitted to vehicle body 12. Such forces include, for example, side-impact forces from another vehicle or object colliding with the vehicle 14.

The carrier module 20 is shown to include a barrier member, also referred to as carrier member or carrier 32. Carrier 32 is shown as being configured for sealed mounting to inner panel 18 and to support a plurality of door hardware components, such as window and door latch components, including a power-operated window regulator having an electric motor-driven cable, pulleys, and lifter plates for moving a window 34 within glass run channels, by way of example and without limitation, as will be understood by one possessing ordinary skill in the vehicle door assembly art.

In accordance with a non-limiting embodiment, carrier 32 can be formed to function both as a fluid (water) barrier and as a sound barrier, and can be provided as a single-piece (monolithic) panel configured to receive a plurality of the aforementioned powered actuators and door hardware components in integrally formed contoured pockets. The carrier 32 can be adapted to be installed in fixed attachment to a surface of the inner panel 18 facing the passenger compartment of the vehicle 14 upon fixing the various components, such as those discussed above, in the internal door cavity 22. The carrier 32 can be formed of any suitable moldable material(s), including fluid/sound barrier material, as desired, in order to meet the desired specifications, such as a foam, plastic (e.g. thermoplastic glass-filled resin, such as glass-filled polypropylene, including long-glass-fiber-reinforced polypropylene (LGFR-PP), which can include glass fibers F having a length up to about 14 mm, by way of example and without limitation) or like moldable materials. Further, in order to facilitate assembly, including ensuring the carrier 32 is properly located and fixed in sealed relation relative to the inner panel 18, the carrier 32 can be formed including a peripherally extending seal bead 36. The seal bead 36 can be provided as any suitable continuous bead of adhesive material capable of maintaining a fluid-tight seal between the carrier 32 and an outer surface of the inner panel 18, such as butyl, by way of example and without limitation.

A selectively removable protective layer 38, sometimes referred to as release paper or release film, and referred to hereafter as release member (not shown), can be disposed over the seal bead 36 until it is desired to expose the seal bead 36 for bonding with the inner panel 18, thereby protecting the seal bead 36 against unwanted contamination.

Carrier 32 of carrier module 20, in accordance with one aspect of the disclosure, is molded to include at least one integrally formed intrusion member, also referred to as intrusion region or impact reinforcement member, shown as a plurality of intrusion members 40, by way of example and without limitation, to provide the carrier module 20 with an enhanced impact resistance against impact forces directed transversely to a plane P (FIG. 2) along which carrier 32 generally extends, thereby enhancing the side impact resistance of carrier 32 and door assembly 10, thus, providing enhanced protection to occupants within motor vehicle 14 during side impacts, such as those experienced during an accident. The enhanced side impact resistance provided by carrier module 20 eliminates the need for separate side impact beams/members, including those commonly found extending within a cavity of a door assembly, thereby freeing up space within cavity 24, which ultimately makes assembly of components therein easier. Further yet, as will be appreciated by the skilled artisan, economies of manufacture and assembly are recognized by having the intrusion members 40 formed as an integrated, monolithic component of the carrier module 20, with weight reduction of the door assembly 10 and enhanced fuel economy of the vehicle 14 also be recognized.

The intrusion member(s) 40 is formed via moldable high bending/tensile strength material, and can include reinforcing fibers distributed uniformly throughout, or localized within specified regions, if desired, and impregnated within resinous material thereof, as discussed further hereafter. Being molded, the intrusion member(s) 40 can be shaped to extend along any desired path, including straight (linear) and/or non-straight, arcuate (nonlinear) paths. It is to be recognized that the aforementioned bending and/or tensile strength of intrusion member(s) 40 is provided to be greater than the bending and/or tensile strength of the remainder of the carrier 32 via controlling the thickness of the molded material within the intrusion member(s) 40, thereby contributing to the overall lightweight structure of the carrier 32. In an exemplary embodiment illustrated, a pair of intrusion members 40 are shown as extending in spaced relation from one another, having generally linear sections 42 extending generally parallel with one another and, having nonlinear and/or non-parallel sections 44 extending from linear sections 42 and/or about carrier features, such as openings 46 provided for receipt of speakers, by way of example and without limitation. The intrusion members 40 are shown as being configured to extend across a width (width direction extending from front end to rear end of motor vehicle 14) of the carrier 32 from one portion of an outer periphery 48 of carrier 32 to another portion of the outer periphery 48 to span a corresponding dimension of the opening 26 in the inner panel 18. As such, it is to be recognized that intrusion member(s) 40 can extend across the entirety of the opening 26, if desired.

Figure 3:
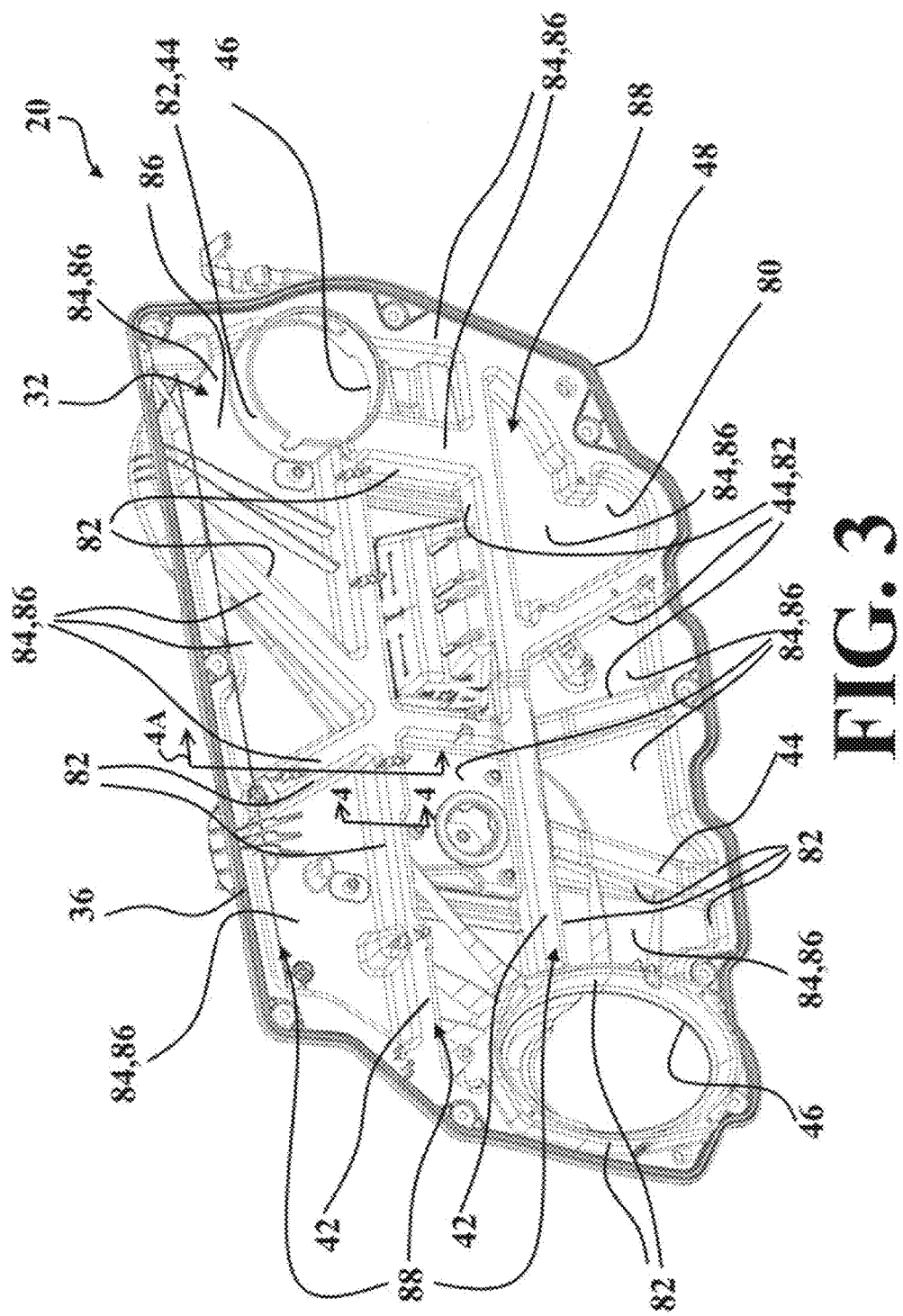
FIG. 3 illustrates a plan view of the carrier module of the door assembly of FIG. 2.
Figure 4A:
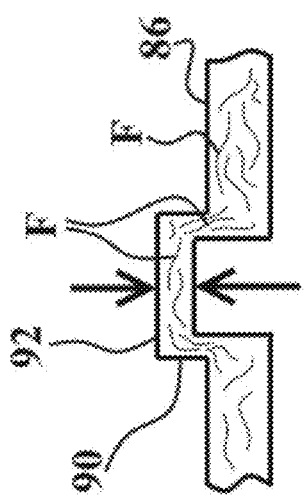
FIGS. 4A-4C illustrate enlarged views of FIG. 4 showing a carrier of the carrier module having been formed under different degrees of compression in an injection molding process.
Figure 4B:
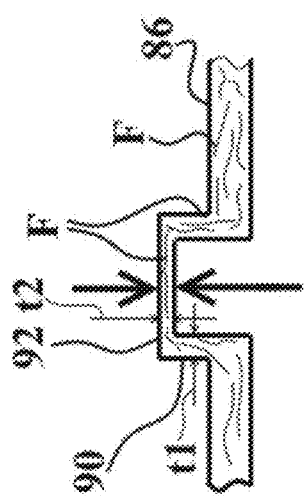
Figure 4C:
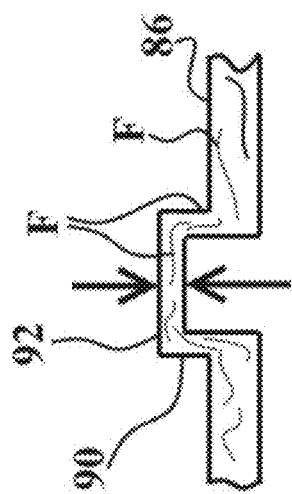
Figure 4D:
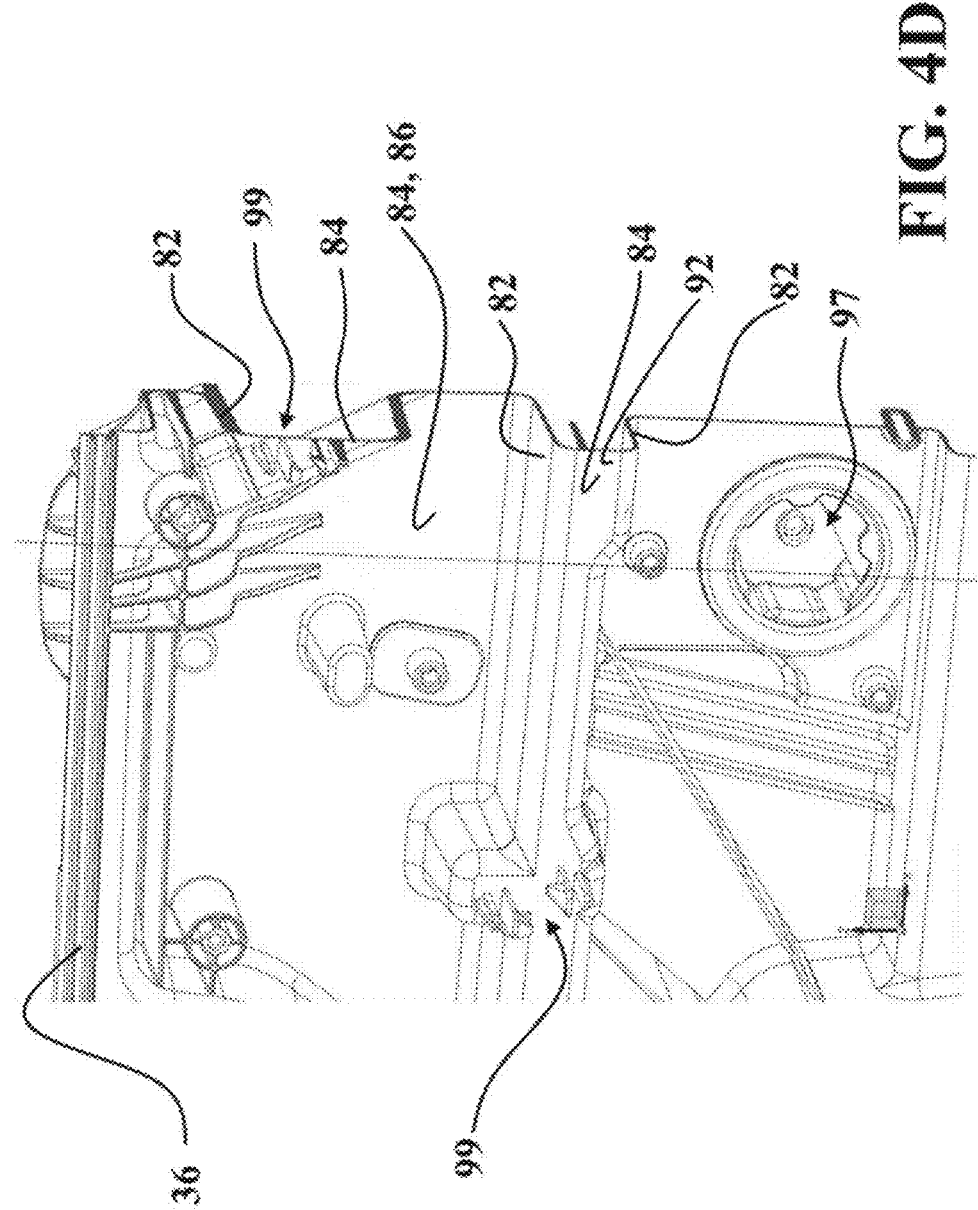
FIGS. 4D to 4F illustrate enlarged cross sectional views of portions of the carrier of the carrier module FIG. 4 showing variable thickness sidewalls and plateaus, in accordance with an illustrative embodiment.
Figure 4E:
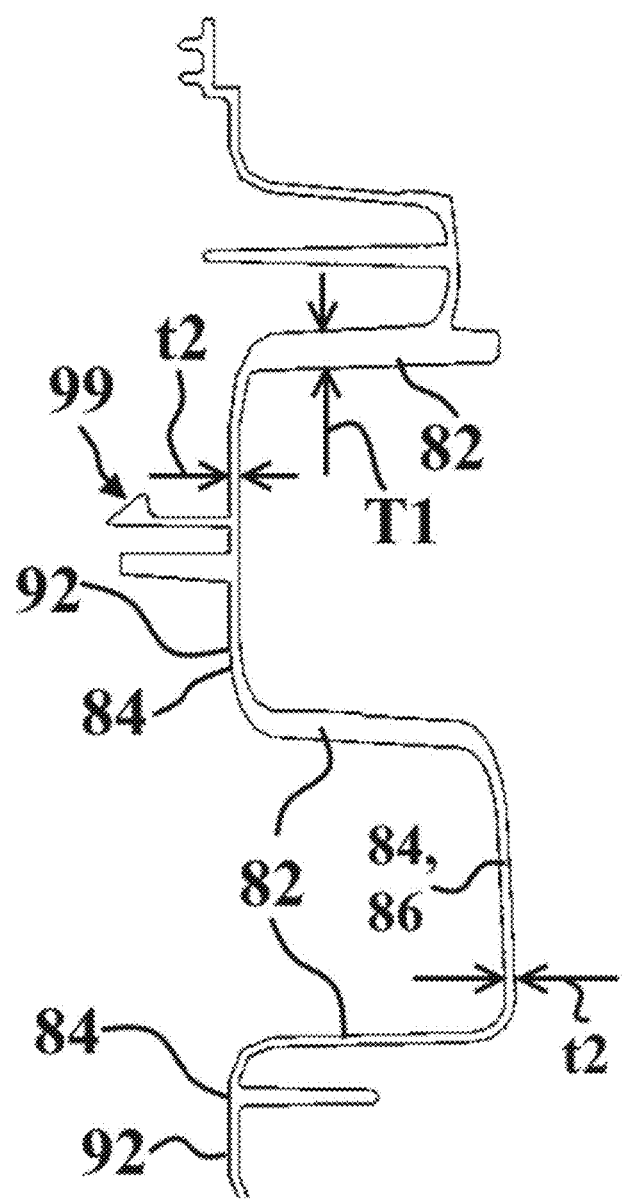
Figure 4F:
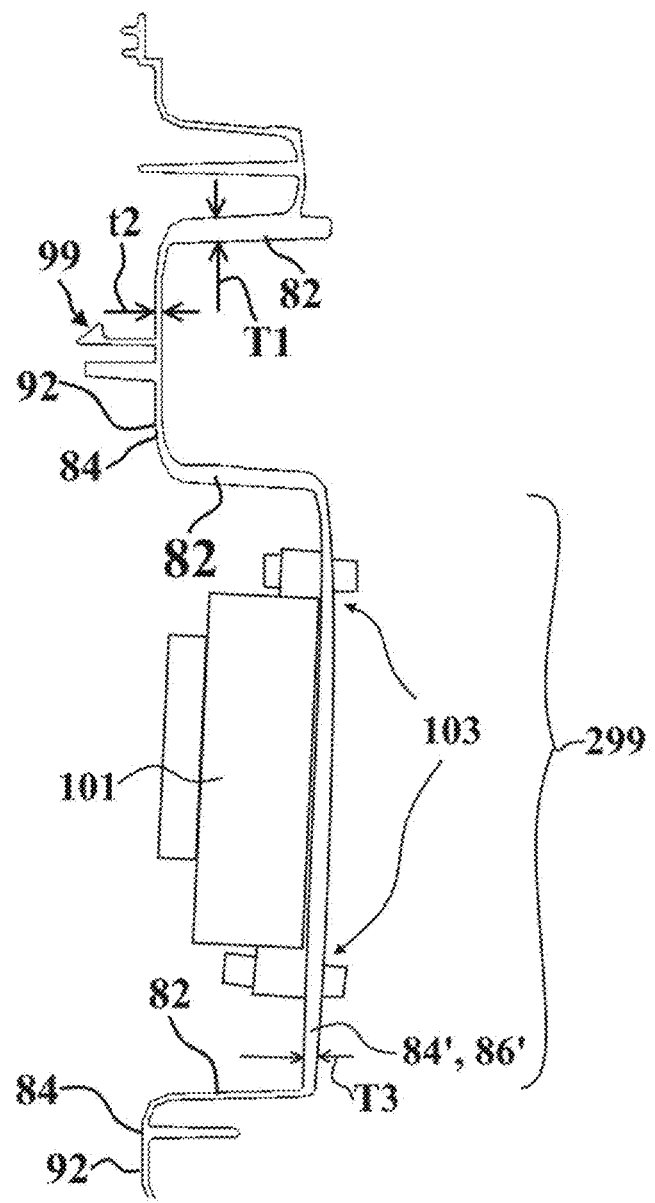
Figure 5:
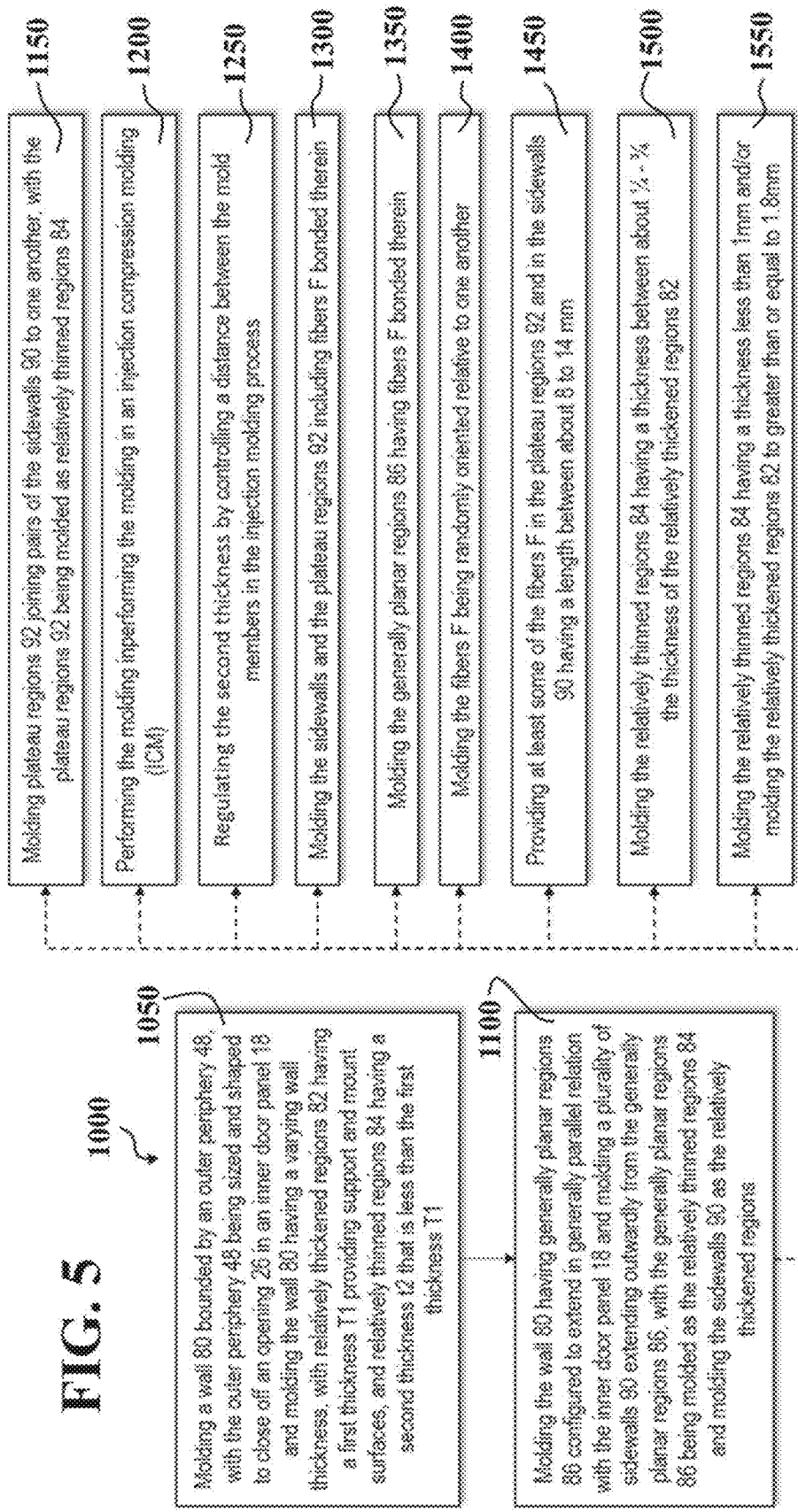
FIG. 5 is a flow diagram illustrating a method of constructing a carrier of a carrier module in accordance with another aspect of the disclosure.

The carrier 32, as best shown in FIG. 3, has a wall 80 bounded by the outer periphery 48, and as discussed above, wall 80 is molded having a varying wall thickness. The varying wall thickness, as shown in FIGS. 4-4E, includes relatively thickened regions 82 having a first thickness T1, such as less than 1.5 mm. For example first thickness T1 can be formed to be less than 2 mm. For example first thickness T1 can be formed to be less than or equal to 1.8 mm, providing enhanced support and mount surfaces, such as for attachment of the aforementioned components discussed above, and providing the integral intrusion member(s) 40 for side impact resistance, and relatively thinned regions 84 having a second thickness t2, such as between about 1.25-2.5 mm, that is less than the first thickness T1, to enhance economies of manufacture and assembly and to provide weight reduction, thereby resulting in increased vehicle fuel economy. Since the structural support is provided thickened regions 82, second thickness t2 can be thinned for providing a water shield function, and first thickness T1 may be for example less than 1 mm. First thickness T1 may be further reduced, for example to less than or equal to 0.5 mm since thinned regions 84 may not function as a load mounting surfaces, for example hardware components, such as rails, window regulator motors, and other module components, but rather for functioning as a water shield. However, some thinned regions 84 depending on the first thickness T1 may optionally be provided for supporting some smaller loads such as ports, 97, wire harnesses/clips 99 (see FIGS. 3, 4D, 4E for examples), and the like. The relatively thinned regions 84 can be provided having a thickness between about ¼-¾ the thickness of the relatively thickened regions. Optionally, a localized region 299 of the thinned regions 84 and planar regions 86 may be molded with increased thickness T3, illustrated using reference numerals 84' and 86' respectively, for providing increased localized material and a planar surface for supporting higher loading components, such as the window regulator motor 101 as an example, illustratively shown as fixed using fasteners 103. Other types of components, for example window rail connections may be mounted to such localized regions.

The wall 80 of the carrier module 20 has generally planar regions 86 configured to extend in generally parallel relation with the inner door panel 18 and a plurality of raised support regions, including channels 88 having sidewalls 90 extending laterally outwardly from the generally planar regions 86. The generally planar regions 86 are generally provided as the relatively thinned regions 84 to function primarily as a barrier, such as to water and contaminants, and the sidewalls 90 of the raised support channels 88 are generally provided as the relatively thickened regions 82 to function primarily as intrusion members 40 and structural support regions to support loads, including loads from the various components and from impact forces. The raised support channels 88 can be provided having generally flat crowns, also referred to as plateaus or plateau regions 92, extending between and joining the pairs of the laterally spaced sidewalls 90 to one another. To further reduce weight, the plateau regions 92 can be provided, via the molding process, as further relatively thinned regions 84. A plurality of the generally planar regions 86 are shown spaced from one another by the channels 88, with the spaced generally planar regions 86 functioning as a barrier to water and contamination, but providing reduced support relative to the sidewalls 90.

In accordance with a further aspect, as briefly discussed above, the wall 80 of the carrier module 20, including each of the integrally molded intrusion members 40, including the sidewalls 90 and the plateau regions 92, is formed from molded high bending/tensile strength material, and can include reinforcing fibers F, also referred to as fibers or glass fibers hereafter, impregnated within resinous material, such as fibers F of long-glass-fiber-reinforced polypropylene (LGFR-PP), by way of example and without limitation. In particular, the wall 80, including the sidewalls 90 and the thinned plateau regions 92 can be molded with glass fibers F having a length up to about 14 mm or greater, if desired, as will be understood by a skilled artisan in view of this disclosure, and preferably ranging between about 8-14 mm, though smaller length fibers can be used in addition to the increased length fibers F. The individual fibers F can take on random orientations relative to one another due to the nature of the forming process discussed hereafter, thereby providing the wall 80 with an isotropic glass fiber F orientation, which in turn results in minimal "molded in" internal stresses. The process used to construct the carrier module 20, injection compression molding (ICM), discussed in more detail hereafter, allows for such isotropic glass fiber orientation, and further allows the relatively long, high strength fibers F to retain their length without being curled or otherwise folded throughout the entirety of the wall 80, including within the reduced thickness plateau regions 92, further enhancing the overall strength of the wall 80; reducing the amount of warp of the wall 80, while also ensuring a relatively uniform and consistent material property throughout the entirety of the wall 80. Further yet, the ICM process allows the desired second thickness t2 to be attained without altering the desired first thickness T1, as shown in FIGS. 4A-4E, as discussed further below.

In accordance with another aspect of the disclosure, a method 1000 of constructing a carrier 32 for a door assembly 10, 11 of a motor vehicle 14 is provided. The method 1000 includes a step 1050 of molding a wall 80 bounded by an outer periphery 48, with the outer periphery 48 being sized and shaped to close off an opening 26 in an inner door panel 18. Further, the step 1050 includes molding the wall 80 having a varying wall thickness, with relatively thickened regions 82 having a first thickness T1 providing support and mount surfaces, and relatively thinned regions 84 having a second thickness t2 that is less than the first thickness T1.

The method 1000 can further include a step 1100 of molding the wall 80 having generally planar regions 86 configured to extend in generally parallel relation with the inner door panel 18 and molding a plurality of sidewalls 90 extending outwardly from the generally planar regions 86, with the generally planar regions 86 being molded as the relatively thinned regions 84 and molding the sidewalls 90 as the relatively thickened regions. Further, the method 1000 can include a step 1150 of molding plateau regions 92 joining pairs of the sidewalls 90 to one another, with the plateau regions 92 being molded as relatively thinned regions 84, having the same or substantially the same thickness as the generally planar regions 86.

The method 1000 can further include a step 1200 of performing the molding in an injection compression molding (ICM) process. As a result, upon injecting the melted plastic/resinous material into an internal cavity of the mold, while moving mold members, such opposite mold halves, also referred to as mold clamps, that are sized and shaped to define the internal cavity to produce the carrier module 20, toward one another to close off the internal cavity, the second thickness t2 of the relatively thinned regions 84 can be controlled in a step 1250, as desired, by controlling a distance between the mold members upon closing the mold members. For example, if a reduced second thickness t2 is desired, e.g. 1.5 mm, as shown in FIG. 4B, the mold members can be moved into abutment or close proximity to one another, or, if an increased thickness t2 is desired, e.g. 2.5 mm, as shown in FIG. 4A, the mold members can be maintained in an increased distance from one another. Regardless of the distance between the mold members, the thickness T1 of the relatively thickened regions 82, e.g. 3-5 mm, can remain constant or generally constant (meaning that a slight variation may result, but the thickness T1 does not vary greatly, or nearly to the extent of the variation of the relatively thinned regions 84). To support loads by the carrier module 20 the thickness T1 may be greater than approximately 1.8 mm. One example configuration of the thickness T1 and the second thickness t2 is the second thickness t2 is less than or equal to 0.9 mm and the wall thickness T1 is less than or equal to 2 mm. Another example configuration of the thickness T1 and the second thickness t2 is the second thickness t2 is less than or equal to 0.5 mm and the wall thickness T1 is greater than or equal to 1.8 mm for providing a high strength to weight ratio of the carrier module 20. Other ratios between second thickness t2 and the wall thickness T1 may be provided when determining the desired strength to weight ratio of the carrier module 20.

The method 1000 can further include a step 1300 of molding the sidewalls 90 and the thinned plateau regions 92 including reinforcing fibers F impregnated within resinous material, such as fibers F of long-glass-fiber-reinforced polypropylene (LGFR-PP), by way of example and without limitation. In particular, the step 1300 can include molding the sidewalls 90 and the thinned plateau regions 92 including the glass fibers F randomly oriented therein, without causing the glass fibers F to become curled, oriented or bunched-up, such as occurs in a standard injection molding process due to relatively increased and varying pressures encountered in a standard injection molding process. Accordingly, the beneficial material properties of the fibers F, including strength and tenacity, can be maintained without causing a reduction thereof. This is made possible in the ICM process due to the plastic/resin/fiber containing material used to mold the carrier module 20 being injected into the mold cavity in the ICM process prior to compressing and compacting the injected material. The pressures encountered in the ICM process are significantly reduced throughout the mold cavity relative to those of a standard injection molding process, such as between about 50-75% lower than pressures of a standard injection molding process, wherein the pressure throughout the mold cavity of the ICM process is generally uniform, thereby resulting in a uniform finished product generally free from elevated internal stresses. For example, the pressures encountered in the ICM process in accordance with the disclosure are uniformly maintained between about 50-300 bar throughout the mold cavity, as compared to about 700 bar at an inlet gate of a standard injection molding process, with the pressure diminishing significantly away from the inlet gate near outer peripheries of the standard injection process mold cavity, such as to about 150 bar, which in turn, causes the fibers to be oriented under high pressure flow, and further yet, curled under high pressure in reduced thickness regions. Accordingly, due to the relatively increased and variable pressures in the standard injection molding process, the fibers able to be used in the standard injection molding process are generally limited to having a maximum length of about ⅓ of the maximum fiber length used in the ICM process, and even less in thinned, reduced thickness regions.

The method 1000 can further include a step 1350 of molding the generally planar regions 86 having fibers F bonded therein.

The method 1000 can further include a step 1400 of molding the fibers F being randomly oriented relative to one another, thereby providing the fibers F having an isotropic orientation, and thus, enhancing their ability to increase the strength of the wall 80 and the intrusion members 40 therein.

The method 1000 can further include a step 1450 of providing at least some of the fibers F in the plateaus 92 and in the sidewalls 90 having a length between about 8-14 mm, thereby enhancing the overall strength of the intrusion members 40.

The method 1000 can further include a step 1500 of molding the relatively thinned regions 84 having a thickness between about ¼-¾ the thickness of the relatively thickened regions 82, and more preferably, having a thickness between about ½-¾ the thickness of the relatively thickened regions 82, thereby reducing the material content and weight of the carrier 32.

The method 1000 can further include a step 1550 of molding the relatively thinned regions 84 having a thickness less than 1 mm, and for example less than or equal to 0.5 mm, and/or molding the relatively thickened regions 82 to greater than or equal to 1.8 mm.

While the above description constitutes a plurality of embodiments of the present invention, it will be appreciated that the present invention is subject to further modification and change without departing from the fair interpretation and intended meaning of the accompanying claims.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A carrier for a motor vehicle door assembly, the motor vehicle door assembly having inner and outer panels defining a door panel structure with the inner panel having an opening for selective access to an internal door cavity containing window and door latch components between the inner and outer panels, said carrier, comprising:
   a wall bounded by an outer periphery sized to close off the opening in the inner panel, wherein the wall is provided having a varying wall thickness, with generally planar regions having a second thickness configured to extend generally parallel with the inner panel, and channels having sidewalls, laterally spaced from one another, having a first thickness extending outwardly from the generally planar regions to generally planar plateau regions having said second thickness, wherein the second thickness is less than the first thickness, wherein said generally planar regions include localized regions having a third thickness for supporting a hardware component, said third thickness being greater than said second thickness.

2. The carrier of claim 1, wherein a plurality of said generally planar regions are spaced from one another by said channels.

3. The carrier of claim 1, wherein said sidewalls and said plateaus have fibers bonded therein.

4. The carrier of claim 3, wherein said planar regions have fibers bonded therein.

5. The carrier of claim 4, wherein said fibers are randomly oriented.

6. The carrier of claim 1, wherein the second thickness is less than or equal to 0.9 mm and the first thickness is greater than or equal to 1.8 mm.

7. The carrier of claim 1, wherein said second thickness is between about ¼-¾ of the first thickness.

8. The carrier of claim 1, wherein said generally planar plateau regions do not function as a load mounting surface.

9. The carrier of claim 1, wherein said wall is formed from plastic.

10. The carrier of claim 1, wherein the generally planar regions are configured to support at least some of the window components.

11. The carrier of claim 1, wherein the hardware component is a window regulator motor.

* * * * *